US012276482B2

(12) United States Patent
Bian

(10) Patent No.: US 12,276,482 B2
(45) Date of Patent: Apr. 15, 2025

(54) METHOD AND SYSTEM FOR SIGHT TARGET ALIGNMENT

(71) Applicants: UNIWIN SMART PTY LTD, Springvale (AU); Xiaomei Duan, Springvale (AU)

(72) Inventor: Hong Lin Bian, Springvale (AU)

(73) Assignee: UNIWIN SMART PTY LTD, Springvale (AU)

( * ) Notice: Subject to any disclaimer, the term of this patent is extended or adjusted under 35 U.S.C. 154(b) by 0 days.

(21) Appl. No.: 18/780,532

(22) Filed: Jul. 23, 2024

(65) Prior Publication Data

US 2024/0377165 A1    Nov. 14, 2024

Related U.S. Application Data

(63) Continuation of application No. PCT/AU2021/050858, filed on Aug. 6, 2021.

(30) Foreign Application Priority Data

Jun. 1, 2021 (AU) ................................. 2021901639

(51) Int. Cl.
   *F41G 3/14*   (2006.01)
(52) U.S. Cl.
   CPC .................... *F41G 3/142* (2013.01)
(58) Field of Classification Search
   CPC .................... F41G 3/142; F41G 3/14
   See application file for complete search history.

(56) References Cited

U.S. PATENT DOCUMENTS

| 9,945,637 | B1 | 4/2018 | Lasslo et al. |
| 10,551,148 | B1 * | 2/2020 | Tamir ......................... F41J 5/10 |
| 11,481,093 | B1 * | 10/2022 | Diaz ......................... G01V 5/22 |
| 2005/0252062 | A1 * | 11/2005 | Scrogin ................... F41G 3/065 |
| | | | 42/114 |

(Continued)

FOREIGN PATENT DOCUMENTS

| WO | 2006041386 A1 | 4/2006 |
| WO | 2019162926 A1 | 8/2019 |

OTHER PUBLICATIONS

International Search Report of PCT Patent Application No. PCT/AU2021/050858 issued on Oct. 18, 2021.

*Primary Examiner* — Thien M Le

(57) ABSTRACT

An apparatus, for use with a projectile launching device, includes the sight, including a viewfinder that permits a user to view an image of a target in association with a reticle, a digital image system for capturing images of the target, multiple sensors to detect a firing time the apparatus for capturing multiple first images at or close to said firing time, wherein an image processor compares images captured after said firing time with said multiple first images, and to identify an indication of a projectile impact on said target, the apparatus being configured to capture multiple second images after said firing time and including said projectile impact indication, and wherein the apparatus includes a reticle adjuster to automatically position the reticle in the viewfinder in accordance with comparison between first images and second images and the associated positions of the reticle and the projectile impact indication.

19 Claims, 12 Drawing Sheets

(56) References Cited

U.S. PATENT DOCUMENTS

| | | | |
|---|---|---|---|
| 2009/0266892 A1* | 10/2009 | Windauer | F41G 3/06 |
| | | | 235/404 |
| 2011/0315767 A1 | 12/2011 | Lowrance | |
| 2012/0126002 A1* | 5/2012 | Rudich | F41G 1/54 |
| | | | 235/404 |
| 2012/0145785 A1* | 6/2012 | Scrogin | F41G 3/065 |
| | | | 235/404 |
| 2016/0084617 A1 | 3/2016 | Lyren | |
| 2016/0102943 A1* | 4/2016 | Teetzel | F41G 1/35 |
| | | | 42/113 |
| 2016/0191761 A1 | 6/2016 | Volfson | |
| 2020/0018566 A1* | 1/2020 | Tubb | F41G 1/38 |
| 2021/0172704 A1* | 6/2021 | Nackel | G02B 7/181 |
| 2022/0178657 A1* | 6/2022 | Gallery | F41G 3/2694 |

\* cited by examiner

METHOD AND SYSTEM FOR SIGHT TARGET ALIGNMENT

CROSS REFERENCE TO RELATED APPLICATIONS

This application is a continuation application of the international patent application No. PCT/AU2021/050858, filed on Aug. 6, 2021, which claims the priority of the Australian Application No. 2021901639 filed on Jun. 1, 2021, the contents of which are incorporated herein by reference in their entirety.

TECHNICAL FIELD

This disclosure relates to a method and system for sight target alignment. In particular, the invention concerns methods and apparatuses for use with a projectile launching device, in order to facilitate alignment of the device with a potential target.

BACKGROUND

Various techniques and devices have been developed to facilitate alignment of a projectile launching device (commonly, a firearm such as a rifle) with a target, in order to assist the user of the device (or "shooter"). One common approach is to mount to the device a telescopic sight (referred to as a "scope" or "sight"), through which the user views the intended target Such a sight includes a reticle. In this specification, the term "reticle" (sometimes termed "reticule") means any known or possible variant of optical or other sight guides for use in aiming. As generally used, a reticle includes a series of fine lines or fibres in the eyepiece of an optical device (such as a telescope or a microscope or on the screen of an oscilloscope) used as a measuring scale or an aid in locating objects. As the skilled reader will understand, there are many different types, a conventional one commonly used with firearm sights being two or more cross hairs, in which intersecting lines form the shape of a cross, the intersection point being the aiming point.

Existing sights typically include a reticle that can be manually adjusted to align the projectile launching device with a target so that a projectile fired from the projectile launching device will impact the target at a predictable position (a process known as "zeroing"). Typically, such adjustment involves a trial and error process, for example, a user may fire one or more projectiles by training the reticle (eg. cross hairs) at an aiming point on a target which is a known distance away, identify the extent to which the projectiles strike the target at locations offset from the aiming point, and then manually adjust the alignment of the sight in relation to the projectile launching device in a manner intended to eliminate the offset. This sequence of steps is repeated in an iterative manner, until projectiles are striking the target at substantially the same location where the user is aiming. At the point, the reticle should be aligned with the point in the sight at which the projectile will strike a target. However, this approach can be a complex, cumbersome and slow process. Furthermore, this process can involve inaccuracies in distinguishing where the projectiles strike the target from other features or artefacts of the target or the scene being viewed through the sight.

Further, existing sights typically have multiple input mechanisms for adjusting the reticle and image viewed through the sight, for example, a plurality of depressible buttons. However, manipulating such input mechanisms can result in inaccurate inputs being entered by the user and can be complex and cumbersome to use, given the particular circumstances in which firearms and sights are often used.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE DISCLOSURE

In a first aspect of the invention, there is provided an apparatus for use with a projectile launching device, the apparatus including: a sight, including a viewfinder that permits a user to view an image of a target in association with a reticle; a digital image system for capturing images of the target viewed in the viewfinder; and one or more sensors to detect a firing time, being a point in time when a projectile is ejected from the projectile launching device, the apparatus configured to capture one or more first images, being images captured at or close to said firing time, said one or more first images associated with the position of the reticle, wherein an image processor is configured to compare images captured after said firing time with said one or more first images, and to identify an indication of a projectile impact on said target, the apparatus configured to capture one or more second images, being images captured after said firing time and including said projectile impact indication, and wherein the apparatus includes a reticle adjuster to automatically position the reticle in the viewfinder in accordance with a comparison between said one or more first images and said one or more second images and the associated positions of the reticle and the projectile impact indication.

In a preferred form, the apparatus is configured to operate in two modes, namely: a first, user-selectable 'sighting shot' mode in order to provide the automatic reticle positioning; a second, normal operation mode for use of the projectile launching device with the sight provided with the resulting positioned reticle.

In a preferred embodiment, the sight comprises a thermal imaging system to capture infrared light information for use with the image capture and processing.

In accordance with this embodiment, the projectile impact indication is a heat signature characteristic of the projectile impacting on the target.

Preferably, the apparatus is configured for use with a well-defined target, being a target having a number of clearly discernible surface features to assist in image processing.

Preferably, the sight includes one or more objective lenses for focusing received light and an image detector, the image detector including a plurality of detector elements for converting the received focused light into electrical signals to be captured as digital images. The one or more objective lenses are preferably manually and/or automatically adjustable to facilitate focusing of received light onto the image detector.

Preferably, the one or more sensors are configured to sense physical movement of the apparatus and/or the projectile launching device characteristic of ejection of a projectile from the projectile launching device. To this end, the one or more sensors may include one or more of a movement sensor (such as an accelerometer or a gyroscope), a pressure sensor, a shock sensor (such as a piezoelectric sensor or a magnetic sensor) and an image analyser. In addition or alternatively, the one or more sensors may include one or more of a sonic sensor, a thermometer, a hygrometer, and an anemometer.

In a preferred form, the one or more sensors include both a movement or shock sensor and a sonic sensor. This may be, for example, an accelerometer and an ultrasonic transducer.

Where the one or more sensors include an image analyser, the image analyser may be configured to act as a sudden movement sensor, to detect rapid movement characteristics in the image, characteristic of a recoil of the projectile launching device on ejecting a projectile.

In one embodiment, where the one or more sensors include an image analyser, the image analyser is integrated into or associated with the image processor.

The one or more first images may include a sequence of images from a prescribed period prior to said firing time.

The one or more second images may include a sequence of images from a prescribed period after said firing time.

The image processor may be configured to compare an aiming image, being one of said one or more first images captured at or shortly before said firing time, with an impact image, being one of said one or more second images captured at or shortly following the moment of first identification of an indication of a projectile impact on the target. The aiming image may thus represent the target in association with a position of the reticle at a final aiming position of the sight.

The apparatus may be configured such that, once said projectile impact indication on the target has been identified, capture of said one or more second images is discontinued.

In one embodiment, the apparatus includes one or more additional controls to allow the user to manually adjust the position of the reticle in the viewfinder.

In one embodiment, the apparatus is configured to enable input or determination of range, being distance from the sight to the target, and to facilitate ballistic trajectory compensation for bullet drop and/or windage in accordance with said range and/or relevant environmental condition data. The apparatus may be configured in this way when operating in said second mode.

This may be by way of the user selectably inputting range information. Alternatively, the apparatus may include a range finder, such as an optical or laser range finder.

In a further aspect of the invention, there is provided a method for calibrating a sight of an apparatus for use with a projectile launching device, said apparatus including a viewfinder that permits a user to view an image of a target in association with a reticle, a digital image system for capturing images of the target viewed in the viewfinder, and one or more sensors to detect a firing time, being a point in time when a projectile is ejected from the projectile launching device, the method including: capturing one or more first images at or close to said firing time, said one or more first images associated with the position of the reticle; using an image processor to compare images captured after said firing time with said one or more first images, and to identify an indication of a projectile impact on said target; capturing one or more second images, being images captured after said firing time and including said projectile impact indication; automatically positioning the reticle in the viewfinder in accordance with a comparison between said one or more first images and said one or more second images and the associated positions of the reticle and the projectile impact indication.

The method may be carried out in a first stage involving a user-selectable 'sighting shot' mode in order to provide the automatic reticle positioning, followed by a second stage involving a normal operation mode for use of the projectile launching device with the sight provided with the resulting positioned reticle.

The capturing of the one or more first images and/or the capturing of the one or more second images may involve capture of thermal images for use with the image processor. The identification of an indication of a projectile impact on said target may include identifying a heat signature characteristic of the projectile impacting on the target.

The method preferably senses physical movement of the apparatus and/or the projectile launching device, being physical movement characteristic of ejection of a projectile from the projectile launching device. Said physical movement may be identified by one or more sensors which may include one or more of a movement sensor (such as an accelerometer or a gyroscope), a pressure sensor, a shock sensor (such as a piezoelectric sensor or a magnetic sensor) and an image analyser. In addition or alternatively, the one or more sensors may include one or more of a sonic sensor, a thermometer, a hygrometer, and an anemometer.

Preferably, the method includes both sensing a movement phenomenon and a sonic phenomenon. In one form, this may include analysing an accelerometer output and an ultrasonic transducer output.

Where said physical movement is identified by an image analyser, this may be realised by detecting rapid movement characteristics in the image, characteristic of a recoil of the projectile launching device on ejecting a projectile. This could be, for example, detecting prescribed change characteristics between images in a successive series of captured images.

Capturing said one or more first images may involve capturing a sequence of images from a prescribed period prior to said firing time.

Capturing said one or more second images may involve capturing a sequence of images from a prescribed period after said firing time.

The method may include comparing an aiming image, being one of said one or more first images captured at or shortly before said firing time, with an impact image, being one of said one or more second images captured at or shortly following the moment of first identification of an indication of a projectile impact on the target. The aiming image may thus represent the target in association with a position of the reticle at a final aiming position of the sight.

The method may involve discontinuing capture of one or more second images once said projectile impact indication on the target has been identified.

The method may include affording manual adjustment of the position of the reticle in the viewfinder.

The method may be carried out within a prescribed distance from the target. For example, at a distance of less than about 25 m from the target.

The method may include inputting or determining range, being the distance from the sight to the target, and facilitating ballistic trajectory compensation for bullet drop and/or windage in accordance with said range and/or relevant environmental condition data.

This may be carried out in said second stage of operation, namely said normal operation mode.

For example, in accordance with this embodiment of the invention, the method may involve the user selectably inputting range information. Alternatively, the method may involve use of a range finder, such as an optical or laser range finder.

In a further aspect of the invention, there is provided an apparatus including an infrared thermal sight for mounting to a projectile launching device including a display viewable by a user and a scroll/press interface mechanism for use by the user in controlling operation and functions of the sight, the scroll/press interface mechanism configured for rotation and pressing, whereby (1) a long press, (2) short press and (3) repeat short presses each provide different ways to access and select operations or functions of the sight.

Preferably, the apparatus does not include any additional user interface elements for controlling the operation and functions of the infrared thermal sight which are viewable by the user on the display.

Preferably, the apparatus is configured such that a long press of the scroll/press interface mechanism is required to unlock the scope and provide the ability to access any other operations or functions of the infrared thermal sight.

Preferably, the scroll/press interface includes at least one control element associated with the operation of the display and configured to receive a user input to effect a change to one or more operational parameters selected from the group consisting of an operating feature, a system setting that configures the operation of the infrared thermal sight, and combinations thereof, wherein the at least one control element is programmed to effect a first operational parameter illustrated on the display to the user in response to user interaction at a first time and to effect a second and different operational parameter illustrated on the display to the user in response to user interaction at a second time different from the first time, the infrared thermal sight configured to, in response to the user input, effect operational changes in the operational parameters stored in the infrared thermal sight.

Hence, the present invention provides automatic calibration of a device such as a firearm, by firing one round only at a target during a 'sighting shot mode', then switching to normal operation. Importantly, during 'sighting shot mode', the calibration can be done in one go, i.e. there is no need for the user to aim again at the target in order to visually identify the impact indication (e.g. the bullet hole) on the target, this is done directly and seamlessly through the image capture and analysis process without the need for any user action or input. Further, no special target is required, provided the target sufficiently lends itself to the image analysis required, which can be limited to providing only a small number of visually or thermally discernible surface features. Hence, the shooter can simply choose to target a tree which is within a suitable range. This is in contrast to prior art approaches of auto-assist rifle scope calibration which have typically required use of special targets to provide a special calibration frame reference. Any relative movement (e.g. movement of the shooter or movement of the target—including a change of range during the process resulting from relative movement towards or away from the shooter) during the process are automatically compensated for by the image comparison algorithm. This, again, is in contrast to prior art approaches to auto-assist in rifle scope calibration, which have generally required that there can be no movement of target or shooter, as this would adversely affect the reliability of the error correction calculations.

By data information input and processing to image capture and analysis, the invention calculates and effects the required reticle positioning independent of all external factors, removing the need for any particular skills to be employed during this critical operation.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 1b is a front view of an input mechanism of the apparatus shown in FIG. 1a.

FIG. 1c is a side view of the input mechanism of the apparatus shown in FIG. 1a.

FIG. 2 is a cross sectional view of the apparatus shown in FIG. 1a.

DETAILED DESCRIPTION

Figure 1A:
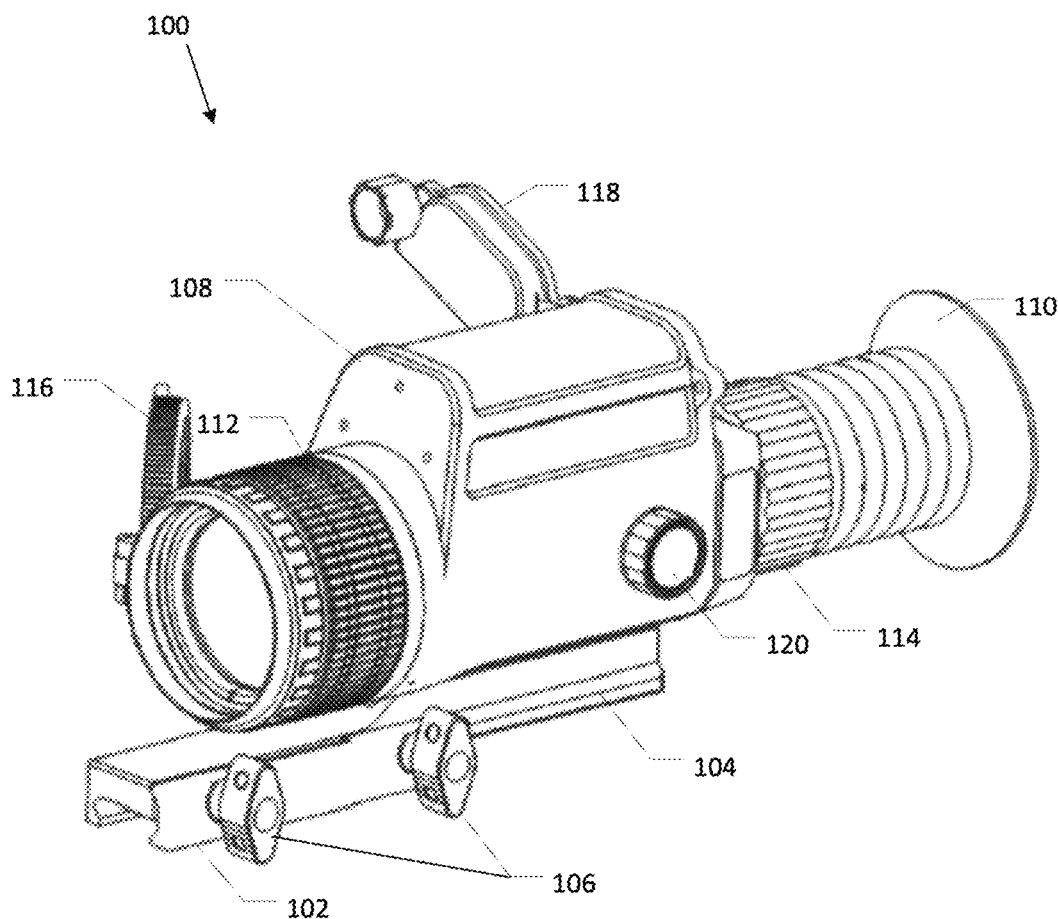
FIG. 1a is a front perspective view of an embodiment of an apparatus in accordance with the present invention.

FIG. 1a illustrates an apparatus 100 for a projectile launching device including a sight, referred to below as "a sighting apparatus". As used herein a "projectile launching device" may be any device suitable for launching a projectile including, for example, a firearm (such as a target pistol, a shotgun, a high velocity rifle), a missile launcher, a bow, a cannon or the like. The sighting apparatus 100 may be integrated with the projectile launching device or may be located separate to the projectile launching device. In the embodiment shown in FIG. 1a, the sighting apparatus 100 is separate to the projectile launching device (not shown) and has one or more mounting mechanisms for mounting the sighting apparatus to the projectile launching device. The one or more mounting mechanisms may include a rail 102 that slidably engages an underside portion 104 of the sighting apparatus and one or more fasteners for fastening the rail to the underside portion. In one example, the one or more fasteners are releasable screws 106. In some embodiments, the mounting mechanism may be (or be similar to) a Picatinny rail assembly, a Weaver rail assembly or a Dovetail rail assembly.

The sighting apparatus 100 includes a housing 108 having one or more adjustment rings for adjusting the image received by the sight and the image viewed at eyepiece 110. In the embodiment shown in FIG. 1a, adjustment rings 114 and 112 control the eyepiece diopter and the focus of the image, by adjusting respective lenses located in the apparatus or within the housing 108. In some embodiments, the sighting apparatus 100 automatically controls the focus of the image. In other embodiments, control may be by manual adjustment by adjustment rings 112, 114. As will be understood, in some embodiments the apparatus can also be provided with a zoom adjustment ring for telescopic zooming of the image.

One or more covers may be provided to the housing for protecting and/or permitting access to the internal components of the sighting apparatus. In the embodiment shown in FIG. 1a, cover 116 protects the objective lens, for example, during storage and transportation, while cover 118 provides access to one or more batteries (not shown) retained in a battery compartment within housing 108. In the embodiment shown in FIG. 1a, the covers 116, 118 are hingedly connected to the housing 108, but any other mechanism that can permit release of the covers from the housing is possible.

The housing 108 may also be provided with one or more depressible, rotatable or otherwise manipulate input mechanisms, in order to control the functions and operations of the sighting apparatus.

Figure 1B:
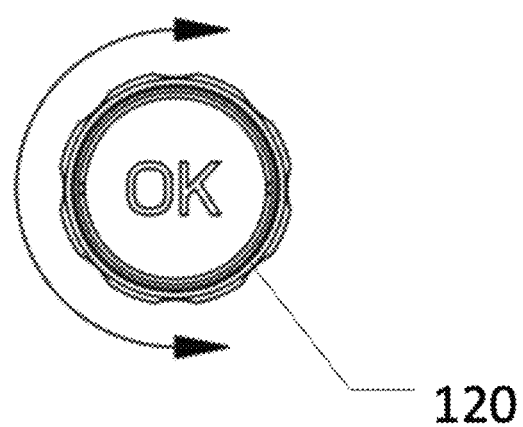
Figure 1C:
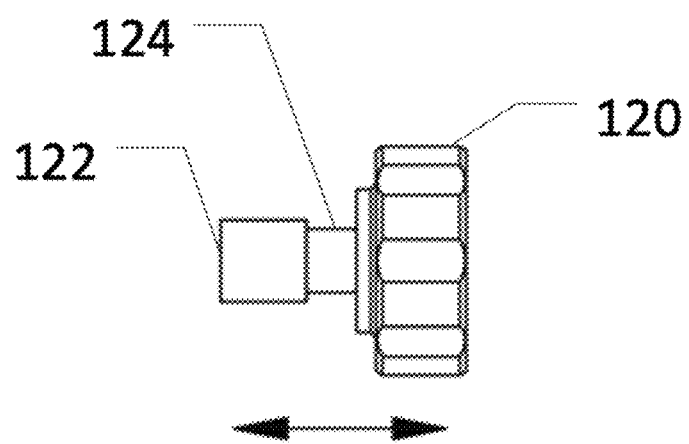

In the embodiment shown in FIGS. 1a-1c, a single depressible and rotatable input mechanism 120 is provided, in the form of a scroll/press knob. This mechanism 120 may be associated with a bearing runner 122 to facilitate rotation of the input mechanism in a clockwise and anticlockwise direction and a rotatable switch 124 located at the centre of the runner 122 to detect depression of the input mechanism 120. The various combinations of depression and/or rotation of the input mechanism 120 control various operations and functions performed by the sighting apparatus 106, as described in further detail with reference to FIGS. 4a-4g. The inventors have determined that a single input mechanism 120 provides a more efficient and effective mechanism for the user to control the operations and functions of the sighting apparatus. Further, a single input mechanism improves the number of accurate inputs received at the sighting apparatus, especially when the sighting apparatus is used in night time or low-light conditions. As will be appreciated from the description below, the apparatus of this embodiment includes only the single mechanism scroll/press knob 120 and does not include any other input mechanisms for selecting or navigating user interface elements/icons displayed on the display and controlling such functions and operations of sighting apparatus.

In the embodiment shown in FIGS. 1a-1c, the input mechanism 120 protrudes from the exterior surface of the housing 108. In other embodiments, the input mechanism 120 may sit flush to the exterior surface of the housing 108. Protrusion of the input mechanism may facilitate easy detection and manipulation of the input mechanism 120 by the user, for example, while they maintain eye contact with the eyepiece 110 of the sighting apparatus 100, without the need to reposition the hand on the device.

As will be understood, an infrared thermal scope is a very complicated piece of equipment, in comparison to a conventional optical sight. Further, as will be appreciated, the myriad of functions and operations of the apparatus to be accessed and selected by the user would conventionally necessitate the use of at least three buttons or other user interface elements on the device, or alternatively a touch-screen control suite. Instead, the single input mechanism 120 and the multilayered OSD menu allows all functions and operations to be conducted in a surprisingly simple and reliable way, enhancing the user experience and minimising the risk of user mis-operation. The user can locate and operate the control effortlessly, without the need to move her eyes away from the eyepiece, and this is of particular value for a device typically used at night or in very low light conditions.

Located within the housing 108 is an objective lens section 202 including an objective lens 204 that focuses light reflected from a target or objects located in a field of view of the lens onto an image detector 206 and adjustment ring 112 for adjusting the focus of the objective lens. The image detector 206 includes a plurality of detector elements for converting the focused light into electrical signals for further processing by processing section 208. In particular, the image detector 206 detects infrared radiation from the focused light and produces a thermal image of the field of view. The image detector 206 converts this thermal image into a series of electrical signals that are supplied to processing section 208 via cable 210. Image detector 206 may be, for example, any one of a VOx infrared detector, a polysilicon infrared detector, or a Mercury Cadmium Telluride infrared detector.

As will be appreciated by those in the art, infrared image detectors are not limited by lighting conditions and are capable of detecting infrared radiation in daytime and night time conditions and during foggy and dusty environmental conditions. For this reason and for reasons discussed below, an infrared image detector is preferred. However, the image detector 206 could alternatively or additionally detect other forms of radiation including ultraviolet, radar, thermal, microwave, X-ray, gamma ray, isotope and particle radiation or include magnetic receptors, vibrational receptors including ultra sound, sound pulse, sonar, seismic vibrations, gravitational receptors, broadcast frequencies including radio wave, television and cellular receptors or visual information of the target and/or remote scene.

The processing section 208 further includes one or more sensors 216 for detecting conditions to which the projectile launching device or the projectile is subject or surrounding environmental conditions, including, for example, one or more of a movement detector (eg. an accelerometer or a gyroscope), a sonic sensor (such as an ultrasonic transducer), an impact or shock sensor (such as a piezoelectric or magnetic sensor), an image analyser, a barometer, a thermometer, a hygrometer, and an anemometer.

In particular, apparatus 100 includes an accelerometer and an ultrasonic transducer. An accelerometer serves as a sensor able to detect the acceleration or vibration of the projectile launching device produced as a result of causing expulsion or ejecting a projectile, for example, combustion of gunpowder or other propellant disposed within a cartridge so as to expel a projectile from the projectile launching device. As will be appreciated by those skilled in the art, when a projectile is expelled it triggers a recoil or a sudden reaction force exerted back on the projectile launching device. The recoil of the projectile launching device will have an acceleration that is different from the acceleration produced in response to other movements, for example, a firing pin striking the cartridge or a movement made by the user. Consequently, in accordance with its programming, the processing section is able to identify the recoil of the projectile launching device and moment of that recoil.

An ultrasonic transducer serves as a sensor that can detect sound waves associated with expelling a projectile from the projectile launching device, for example, the sound waves generated by the combustion of gun powder or other propellant disposed within a cartridge or the sound waves generated by the projectile travelling forward through the projectile launching device (in particular, a sonic boom). Such an event will produce a sound wave which is different from the sound waves produced in response to, for example, a firing pin striking the cartridge, or environmental sounds. For example, the combustion associated with firing of the projectile may have a higher frequency sound wave compared to a firing pin striking a cartridge or a sound wave of higher intensity. Consequently, in accordance with its programming the processing section 208 is able to identify the firing of the projectile and the moment of that event.

The processing section 208 may further include a global positioning chip 226 for detecting the location of the projectile launching device to which the sighting apparatus is mounted and a wireless data transmission chip 228 for wireless transmission of data to one or more databases 302 via a network 304. The wireless data transmission chip 228 may also facilitate the transmission and receiving of data from one or more devices located external to the sighting apparatus 100.

The processing section 208 includes a processor 212 for performing signal processing on the electrical signals received from the image detector 206, the one or more sensors 216, and the GPS 226 and generate an image of the field of view that is transmitted to display 218. The processor 212 may further superimpose the image of the field of view with further information such as a reticle, one or more icons and/or affordances for selecting one or more menu options presented on display 218, a bounding box defining the boundaries of the target, or a bounding box defining the boundaries of the display. The resolution of the display 218 may also correspond to the number of detector elements of image detector 206.

The sighting apparatus 108 includes eyepiece optics 220 that permit the display 218 to be viewed by an eye of a user using the sighting apparatus. In one embodiment, the eye piece optics 220 include an ocular lens 222 and adjustment ring 114 for adjusting the ocular lens, by performing a diopter adjustment of the image viewed.

The processing section 208 further includes memory 214 and may include a read only memory (ROM) that contains one or more programs executed by the processor 212, as well as data that does not change during program execution. The memory 214 may also include some random access memory (RAM), in which the processor 212 can store data that changes dynamically during program execution. The memory 214 may also include some semiconductor memory of the type commonly known as "flash RAM", which is random access memory that will maintain information stored in it through a power loss. Memory of this type is commonly used in devices such as memory cards for digital cameras.

Figure 2:
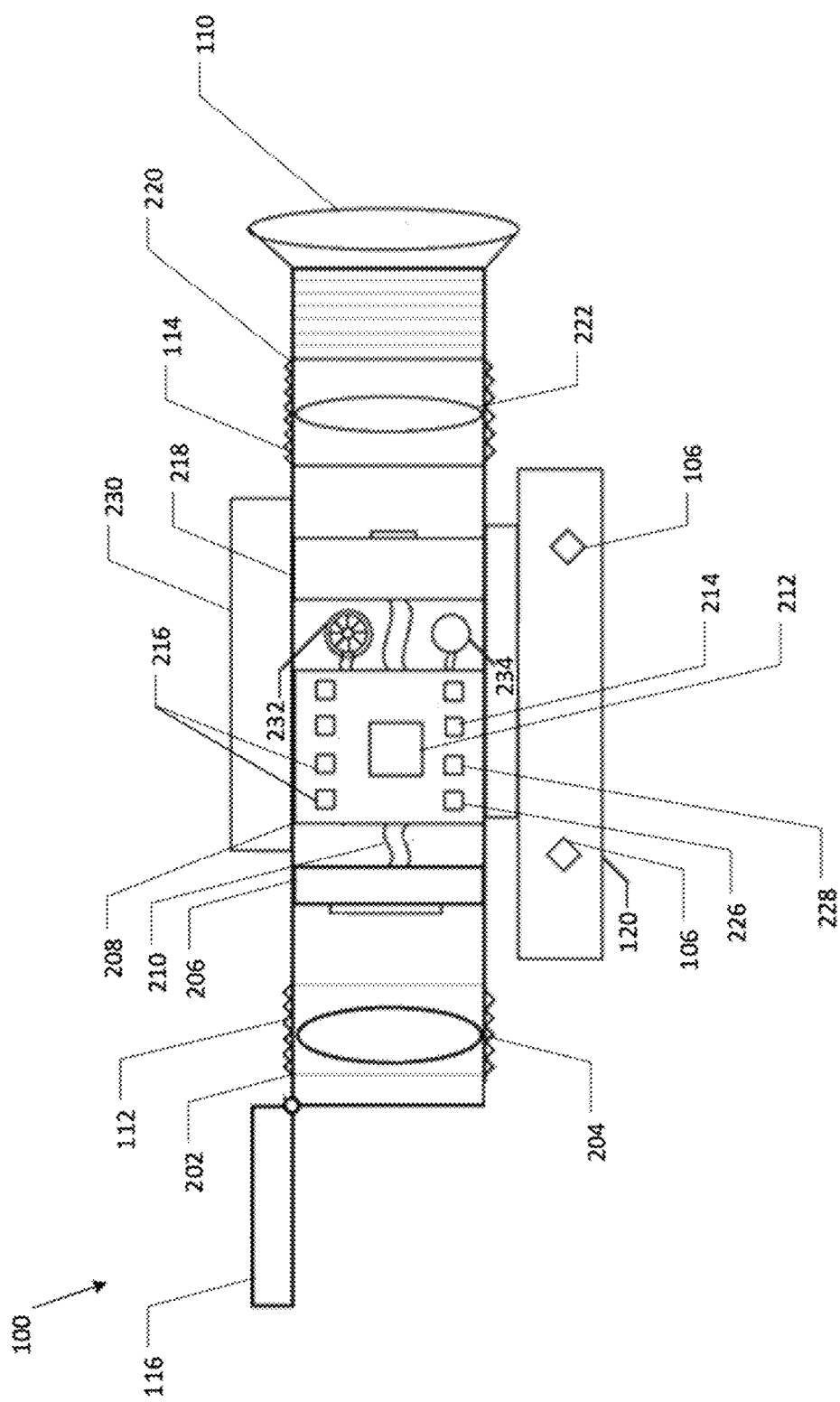

The processing section 208 is connected to one or more batteries located in compartment 230 by one or more cables to provide power to the image detector 206, processing section 208, and display 218. Although the batteries in the embodiment shown in FIG. 2 are replaceable, it would alternatively be possible to use rechargeable batteries.

The processing section 208 further includes an incremental encoder 232 connected to the input mechanism 120. The incremental encoder 232 may transmit periodic pulse signals, for example, pulse A and pulse B signals to the processor 212 in response to depression and/or rotation of the input mechanism 120. The number of pulse signals transmitted by the incremental encoder corresponds to the number of rotations of the input mechanism 120. The direction of rotation of the input mechanism is distinguished by the phase relationship between the pulse signals transmitted by the incremental encoder. For example, the phase difference between the A and B pulse signals is 90 degrees. In response to rotation of the input mechanism 120 in a first direction, an A pulse signal will be shifted +90 degrees ahead of a B pulse signal. In response to rotation of the input mechanism 120 in a second direction opposite to the first direction, a B pulse signal will be shifted +90 degrees ahead of an A pulse signal.

The processing section 208 further includes a port 234 for connecting to the sighting apparatus. This may be used to upgrade firmware for example, or it may be for use as a debugging port, to be used during the manufacturing process to test, configure and set the factory settings of the apparatus.

Figure 3:
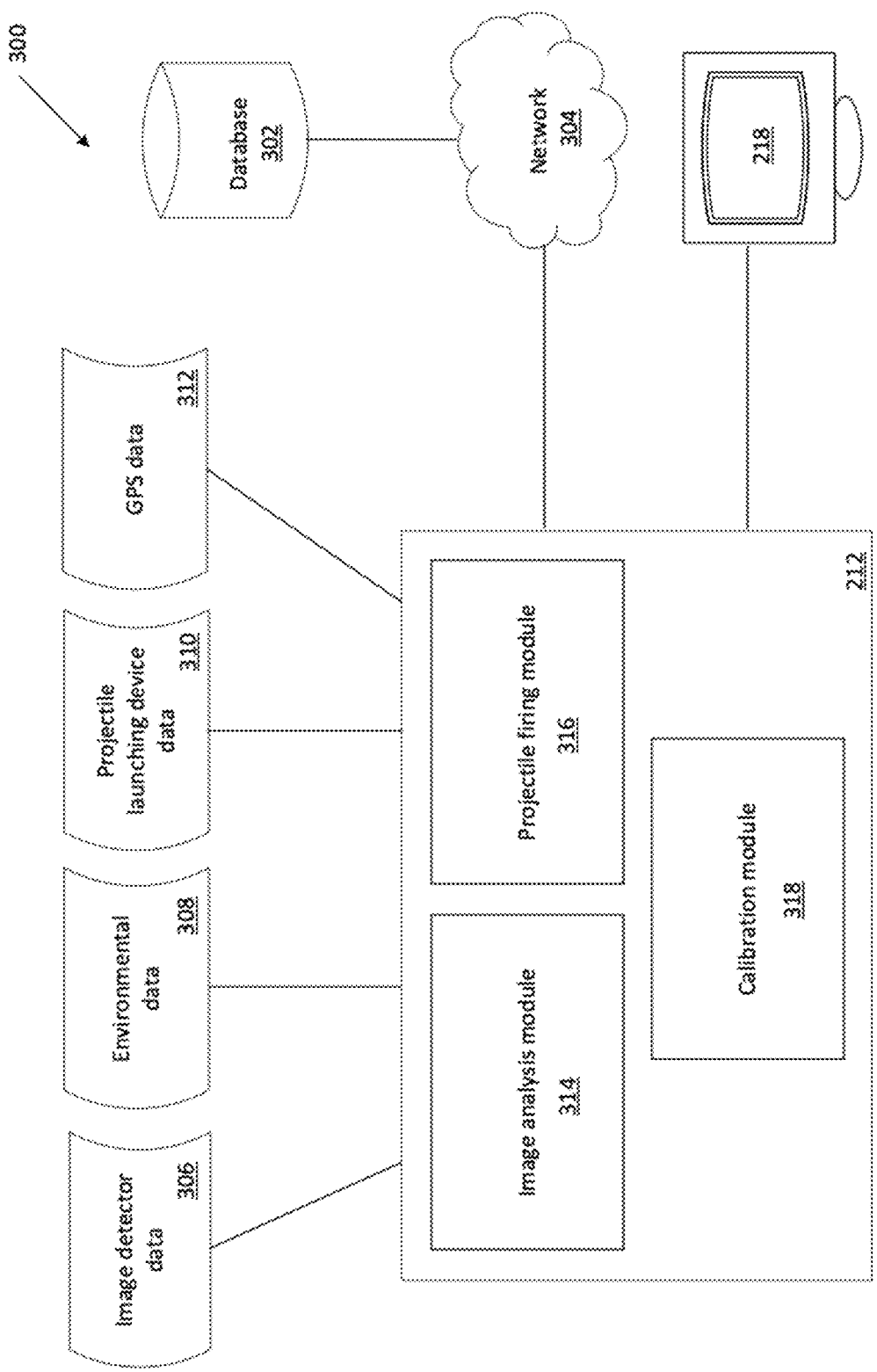
FIG. 3 is a block diagram of an embodiment of a processing system of the apparatus, used for facilitating alignment of a projectile launching device with a potential target.

FIG. 3 illustrates an example of a processing system 300 for facilitating alignment of a projectile launching device with a potential target. In this example, the system 300 includes the processor 212 in communication with the one or more sensors 216, the GPS 226 and the image detector 206 of FIG. 2. The processor 212 receives data 306 obtained from the image detector, environmental data 308, data 310 relating to the projectile launching device and GPS data 312. For example, the data obtained from the image detector may be a thermal image of the field of view of the sighting apparatus. In another example, the environmental data may include humidity, temperature, atmospheric pressure, or wind speed data. In another example, the data relating to the projectile launching device includes the acceleration of the device, the orientation of the device, or the tilt of the device.

In the following description, reference is made to "modules". This is intended to refer generally to a collection of processing functions that perform a function. It is not intended to refer to any particular structure of computer instructions or software or to any particular methodology by which the instructions have been developed.

The image analysis module 314 receives data 306 from the image detector to determine whether the projectile has impacted the potential target and determine the moment that the projectile has impacted the target. The image analysis module 314 may also detect the projectile firing moment, for example, by detecting blurred or distorted images that could indicate that firing of the projectile has occurred. The image analysis module 314 may determine the images corresponding to the moment that the projectile was fired and the moment that the projectile has impacted the target. The image analysis module 314 may also determine the point where the user was aiming the projectile launching device at the time of firing the projectile launching device and the point where the projectile impacted the target.

The projectile firing module 316 may receive one or more of: environmental data 308, projectile launching device data 310 and GPS data to determine the moment that the projectile launching device was fired. In some embodiments, the projectile firing module 316 may also interact with the image analysis module 314 to determine the moment that the projectile launching device was fired.

The calibration module 318 interacts with the image analysis module 314 to determine the deviation between the aiming point and target impact point and to determine a corrected aiming point. The calibration module may also interact with the projectile firing module to determine a ballistic trajectory correction.

The processing system 300 is in communication with the display 218 of sighting apparatus, for example, to display the corrected aiming point.

Figure 4A:
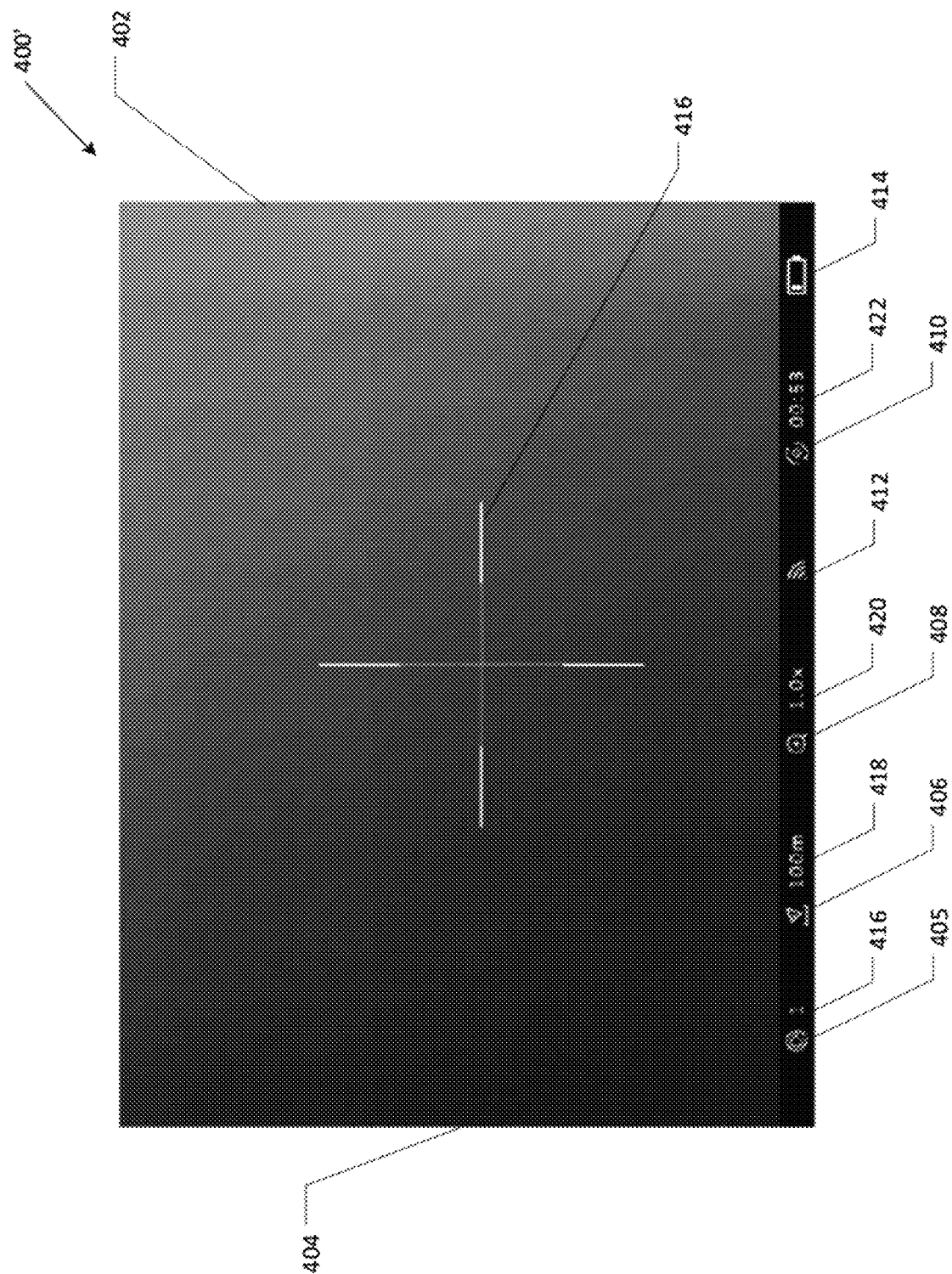
FIG. 4a illustrates a user interface of a home screen of the apparatus.

FIG. 4a illustrates an embodiment of a first user interface 400', in particular a graphical user interface, appearing on the display of the sighting apparatus 100. The user interface 400' displays a home screen 402 including an image 404 representing the current field of view detected by the sighting apparatus and one or more border icons 405-414 for indicating one or more settings of the sighting apparatus or a status of one or more components of the sighting apparatus. In the embodiment shown in FIG. 4a, icons 405, 406, 408 and 410 indicate zeroing profile, distance setting, zoom setting and auto refresh setting of the sighting apparatus, respectively. In FIG. 4a, the icons 412 and 414 indicate, respectively WIFI on/off status and battery status of the sighting apparatus. User interface 400' may include a charging status of the battery.

In some embodiments, the icons are associated with contextual information for providing the user with further information pertaining to the icon. In FIG. 4a, text "1" 416 is displayed in association with the zeroing profile icon 405 indicating to the user that zeroing profile number 1 of the sighting apparatus is currently selected. Similarly, text "100 m" 418 is displayed in association with the distance setting icon 406 indicating to the user that the sighting apparatus is located 100 m away from the target. Similarly, text "1.0×" 420 is displayed in association with the zoom setting icon 408 indicating the current zoom level of the image. Similarly, text "00:53" 422 is displayed in association with the auto refresh icon 410 indicating to the user that the countdown refreshment of the image 404 is 53 seconds.

The image 404 of the field of view is superimposed with further information, including a reticle and (optionally) one or more affordances for selecting one or more menu options presented on the display, a bounding box correlating with the target, and/or a bounding box defining the boundaries of the display. In the embodiment shown in FIG. 4a, the image 404 is superimposed with a cross hair reticle 416.

While the first user interface 400' is displayed, one or more depressions and/or rotations of the input mechanism 120 will control various settings and/or operations of the sighting apparatus 106. In one example, depressing the input mechanism 120 for a period of time below a first threshold value, while the first user interface 400' is displayed, will cause the display of the sighting apparatus to refresh. In another example, rotation of the input mechanism 120 in a first direction, while the first user interface 400' is displayed, will perform a zoom-in operation on the displayed image 404. In another example, rotation of the input mechanism 120 in a second direction opposite to the first direction, while the first user interface 400' is displayed, will perform a zoom-out operation on the displayed image. In yet another example, depressing the input mechanism 120 for a period of time above a first threshold value, while the first user interface 400' is displayed, will cause a second user interface 400" having one or more selectable menu icons for controlling the settings of the sighting apparatus to be displayed (see below with reference to FIG. 4b, 4c). In yet another example, depressing the input mechanism for a period of time above a second threshold value, while the first user interface 400' is displayed, will cause sighting apparatus to initiate a powering down procedure.

While the second user interface 400" is displayed, one or more depressions and/or rotations of the input mechanism 120 will control various settings and/or operations of the sighting apparatus 106. In one example, depressing the input mechanism 120 for a period of time below a first threshold value, while the second user interface 400" is displayed, will cause selection of an icon displayed on the display or confirm selection of a highlighted icon. Selection of an icon may display one or more menus and/or sub-menus associated with the selected icon. In another example, rotation of the input mechanism 120, while the second user interface 400" is displayed, will perform a scrolling operation through a series of displayed icons. In yet another example, depressing the input mechanism 120 for a period of time above a first threshold value, while the second user interface 400" is displayed, will collapse a displayed menu and/or sub-menu or return to the first user interface 400'. In yet another example, depressing the input mechanism 120 for a period of time above a second threshold value, while the second user interface 400" is displayed, will cause sighting apparatus to initiate a powering down procedure. In one embodiment, if the sighting apparatus receives no input from the input mechanism 120 for a period of time above a third threshold value a displayed menu and/or sub-menu may be collapsed automatically or the displayed second user interface 400" automatically returns to the first user interface 400'.

In one example, the first threshold value is less than or equal to 1 second, the second threshold value is less than or equal to 3 seconds and the third threshold value is less than or equal 60 seconds, however, any suitable time periods may be used.

Figure 4B:
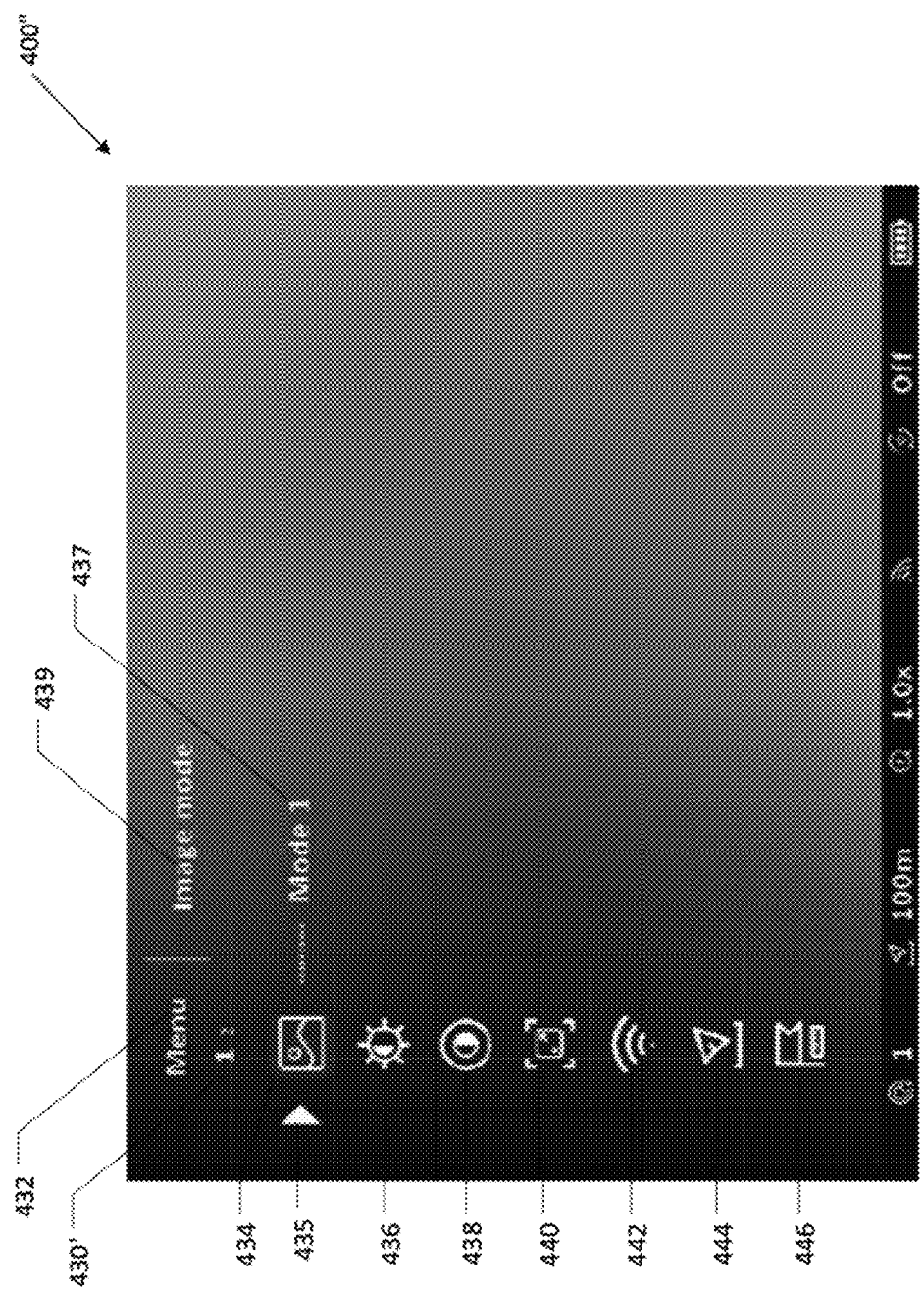
FIG. 4b illustrates a user interface for selecting and controlling one or more settings of the apparatus in accordance with an embodiment of the invention.
Figure 4C:
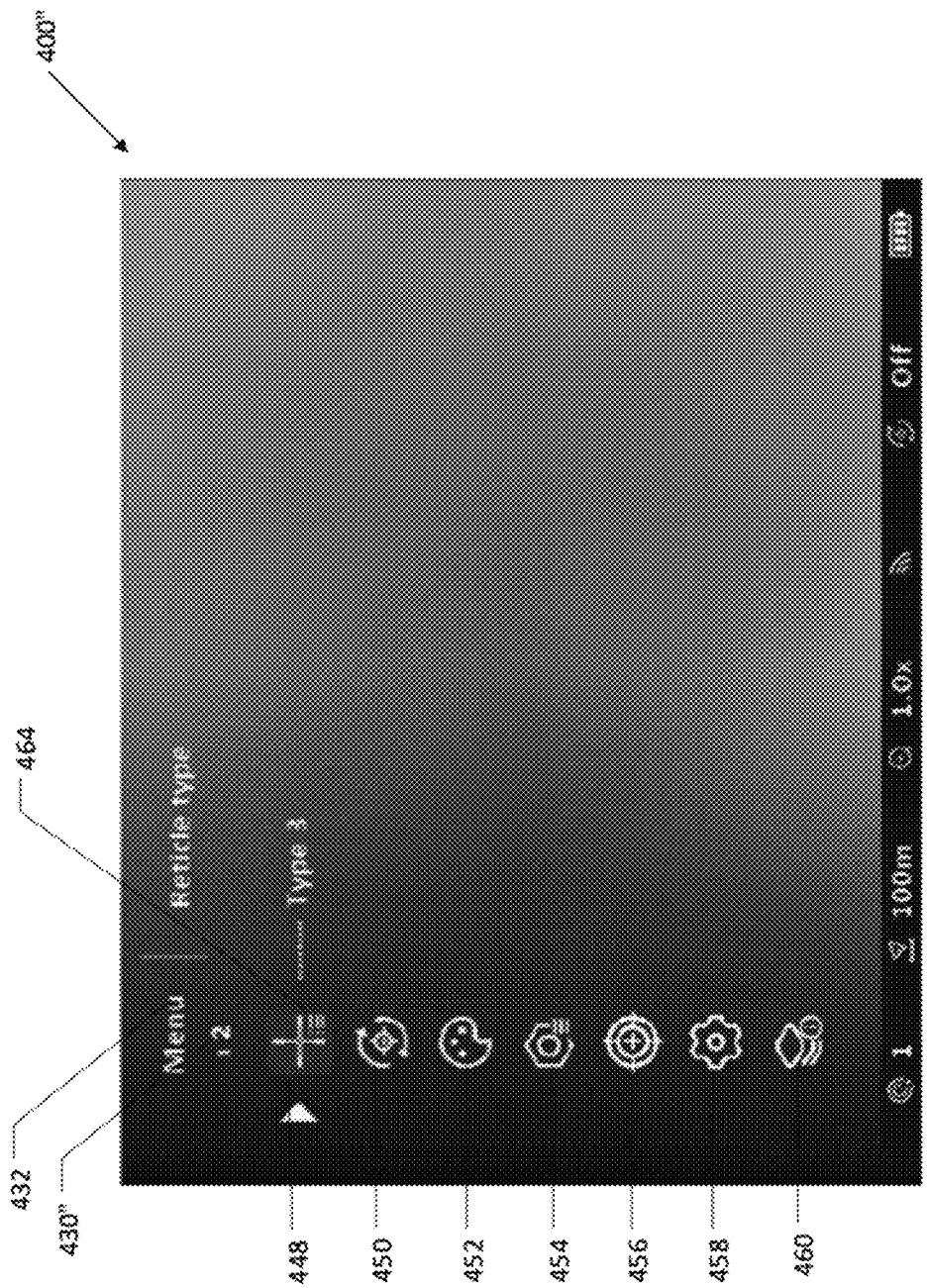
FIG. 4c illustrates another user interface for selecting and controlling one or more settings of the apparatus in accordance with an embodiment of the invention.

In one embodiment, the second user interface 400" includes one or more sets of selectable icons for controlling various settings and/or operations of the sighting apparatus 106. In one embodiment, the one or more sets of icons are overlaid on the image 404 of the field of view of the sighting apparatus. As shown in FIGS. 4b and 4c, the second user interface 400" is associated with two sets of icons corresponding to a first page 430' and a second page 430" of displayed menu 432. Each icon may be associated with a hierarchy of menu options, for example, each icon may be associated with a menu whereby each menu is associated with one or more sub-menus. In some embodiments, a visual indicator may be provided on an icon when it is associated with a hierarchy of menu options, for example, visual indicator 464 associated with icon 448. In some embodiments, the currently selected icon may also be provided with a visual indicator, for example, triangular indicator 435 associated with icon 434 shown in FIG. 4b. In some embodiments, contextual information 437, 439 associated with a currently selected icon 434 may be displayed adjacent to the icon 434 and/or the displayed menu 432.

Some examples of the types of settings and/or operations of the sighting apparatus that may be represented by an icon will now be described with reference to icons 434-460. Icon 434 controls the imaging mode of the sighting apparatus, for example, between a first imaging mode and a second imaging mode. Icon 436 controls the brightness level of the display, for example, between a range of 1-20 lumens. Icon 438 controls the contrast of the display, for example, between a range of 1-20 lumens. Icon 440 controls a 'picture-in-picture' function that superimposes an image of the area encompassed by the target bounding box on a portion of the image 404. The image of the area encompassed by the target bounding box may be magnified and/or the image of the area encompassed by the target bounding box may be superimposed on an uppermost portion of the image 404. Icon 442 controls the wireless communication of sighting apparatus with one or more external devices. Icon 444 controls the selection of the distance between the projectile launching device and the target. Icon 446 controls measurement of the distance between the projectile launching device and the target when the height of the target is known. Icon 448 controls the type of reticle to be superimposed on the image 404. Icon 450 controls the automatic refresh and/or refresh interval of the displayed image, for example, 1 minute, 3 minutes, or 5 minutes. Icon 452 controls the colour pallete of the displayed image, for example, White, Black, Ironbow, Globow, Sepia, Red, or Green. Icon 454 controls the entry of predetermined 'sight in' values of various projectile launching devices used with the sighting apparatus and the associated ballistic parameters, such as muzzle velocity of the projectile intended to be used and the bullet drop at: 50 meters, 100 meters, 150 meters, 200 meters, 250 meters, and 300 meters. Icon 456 controls the automatic or manual zeroing/calibration of the alignment of the projectile launching device with the target. Icon 458 controls general settings of the sighting apparatus including: the trigger footage, the WIFI password, the system time, the restoration of the reticle to factory settings, and the restoration of the sighting apparatus to factory settings. Icon 460 controls the display of information relating to the sighting apparatus.

Figure 4D:
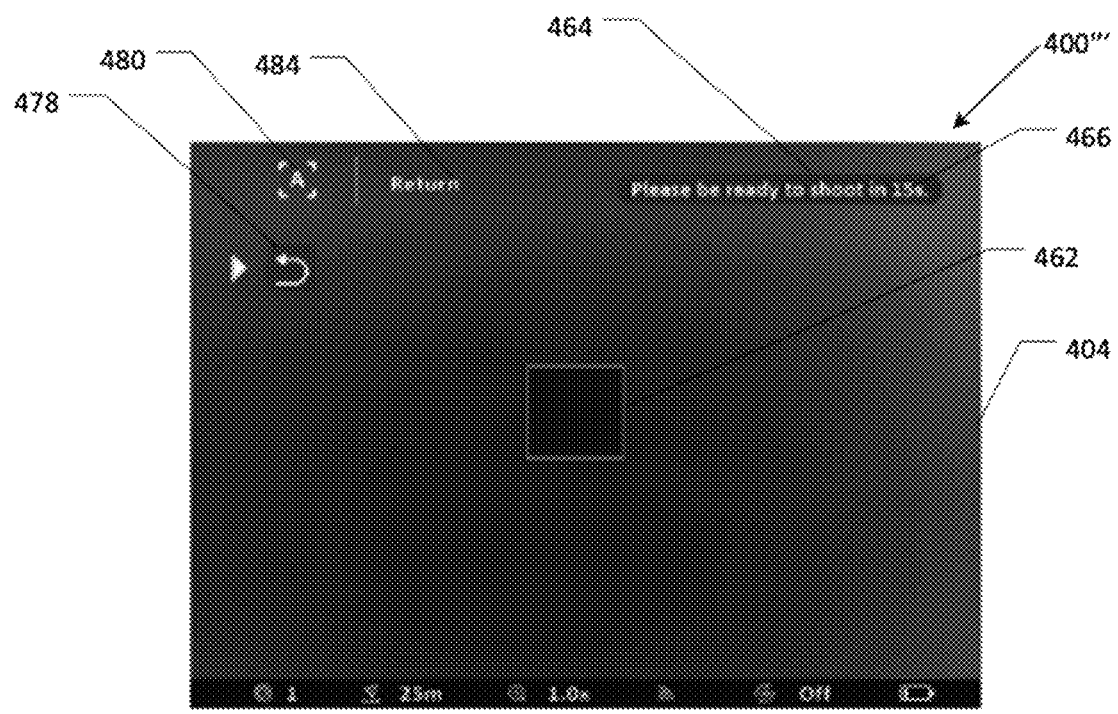
FIG. 4d illustrates a user interface for performing automatic alignment of the projectile launching device with a target in accordance with an embodiment of the invention.
Figure 4E:
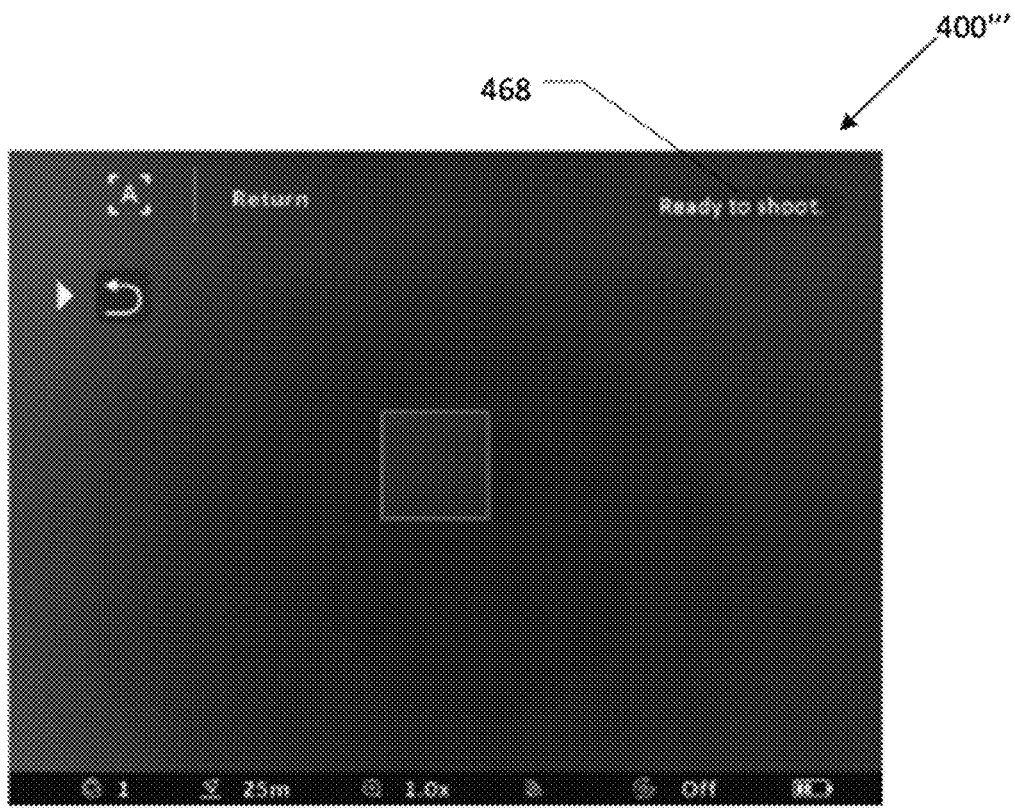
FIG. 4e illustrates another user interface for performing automatic alignment of the projectile launching device with the target in accordance with an embodiment of the invention.
Figure 4F:
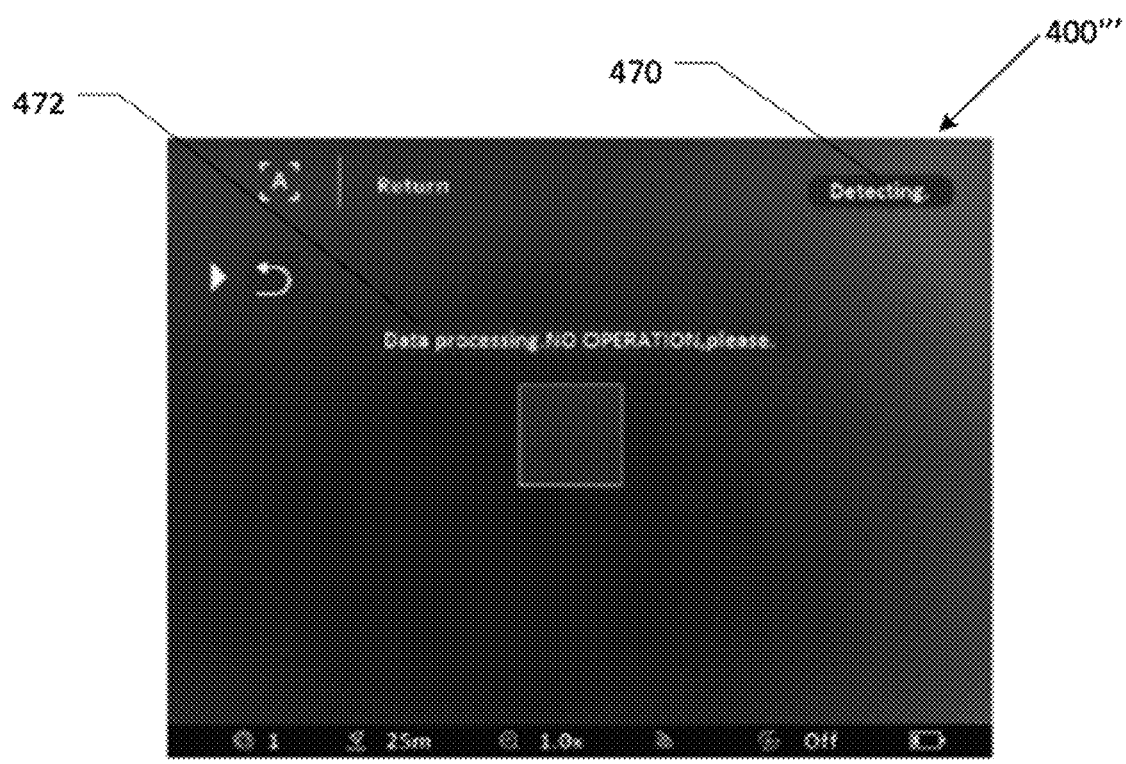
FIG. 4f illustrates still another user interface for performing automatic alignment of the projectile launching device with the target in accordance with an embodiment of the invention.
Figure 4G:
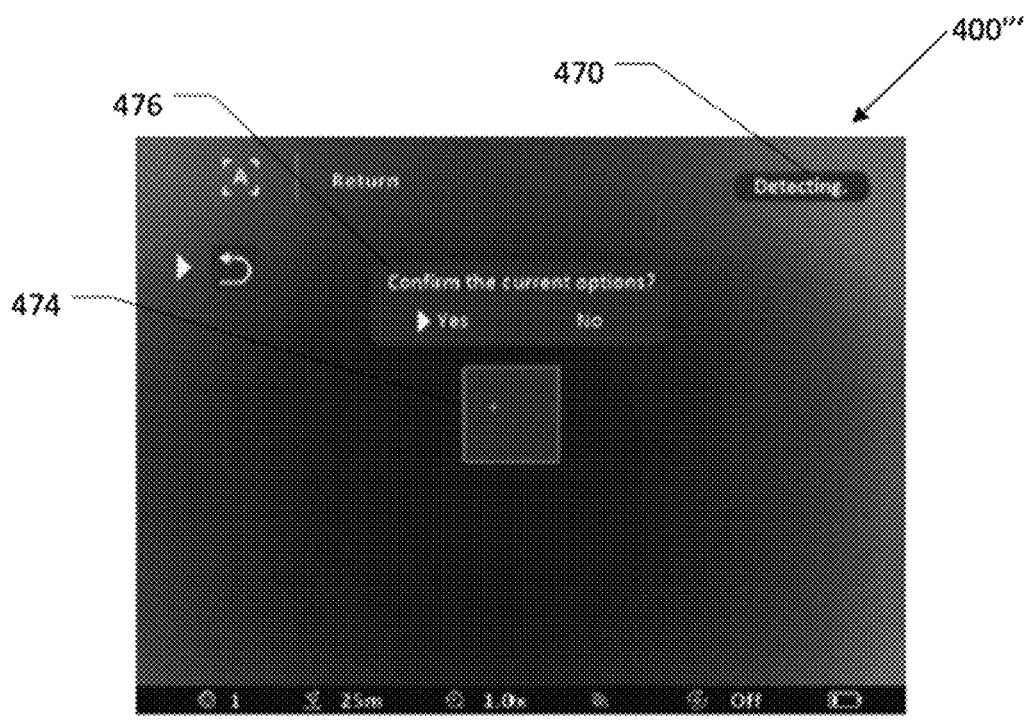
FIG. 4g illustrates still another user interface for performing automatic alignment of the projectile launching device with the target in accordance with an embodiment of the invention.

Selection of icon 456 will invoke an automatic zeroing/calibration mode of the sighting apparatus for aligning the projectile launching device with the target and invoke display of a third user interface 400''' as shown in FIGS. 4d-4e. A boundary box 462 will be superimposed on the image 404 and displayed at the centre of the third user interface 400'''. In response to entering the automatic zeroing/calibration mode the zoom and refresh settings of the sighting apparatus will be automatically disabled. Upon entering the zeroing/calibration mode, the sighting apparatus will display a first prompt 464 (for example "Please be ready to shoot in 15 s" in FIG. 4d) requesting that the user prepares their projectile launching device for firing. In one embodiment, the first prompt 464 is provided with a countdown timer 466 indicating the time that the sighting apparatus will require to detect the target before the projectile launching device is fired. When the countdown time has expired, the first prompt 464 changes to a second prompt 468 (for example "Ready to Shoot" in FIG. 4e) indicating that the user may fire the projectile launching device. Once a projectile has been fired, the sighting apparatus performs zeroing/calibration and replaces the display of the second prompt 468 with a third prompt 470 (for example "Detecting" in FIG. 4f). In one embodiment, a fourth prompt 472 (for example "Data processing. NO OPERATION, please" in FIG. 4f) is displayed at the center of the third user interface 400'''. If the sighting apparatus detects that the projectile has impacted the target, the sighting apparatus performs automatic zeroing/calibration of the aiming point and an adjusted reticle 474 is displayed in the third user interface 400''' as shown in FIG. 4g. The fourth prompt 472 is replaced with a selectable affordance 476 (for example "Confirm the current options? Yes/No" in FIG. 4g) confirming the zeroed/calibrated aiming point. If the sighting apparatus does not detect that the projectile has impacted the target, the sighting apparatus foregoes automatic zeroing/calibration of the aiming point and the fourth prompt 474 is replaced with a fifth prompt (for example "No bullet holes detected, shoot again"). The third user interface 400''' of FIGS. 4d-g may also be provided with a selectable icon 478 for exiting the automatic zeroing/calibration mode and returning to the second user interface 400'' of FIGS. 4b-c. The third user interface 400''' may also be provided with an icon 480 indicating the current mode of the sighting apparatus and contextual information 484 associated with the currently selected icon 478. In one embodiment, the first, second, third, fourth and fifth prompts and/or selected icon 480 may be visually distinguished from the image 404 displayed in the third user interface 400'''.

Figure 5:
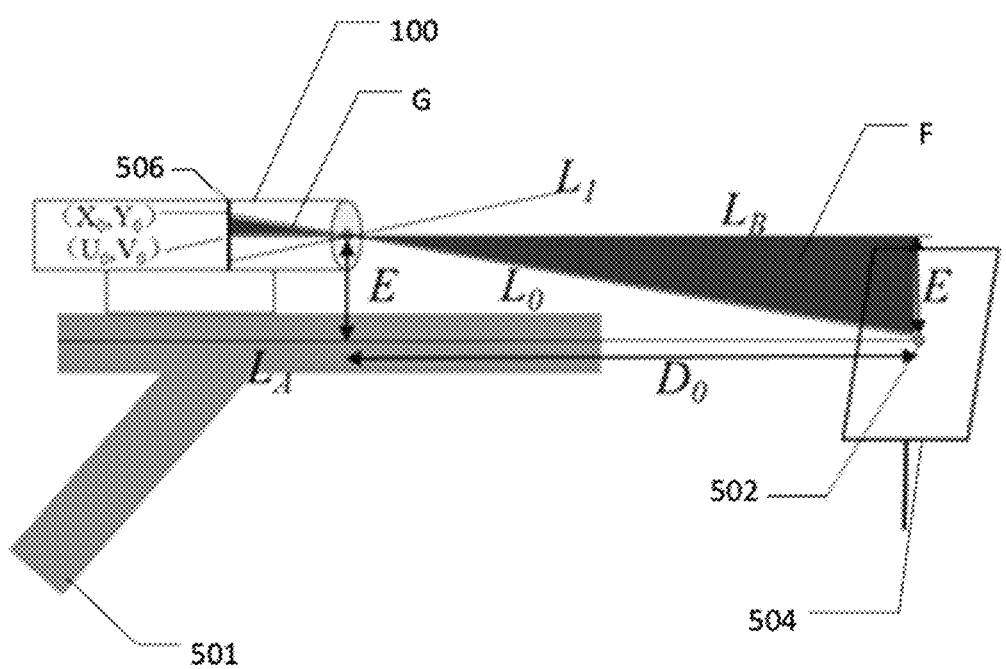
FIG. 5 is a diagram illustrating the apparatus mounted to a projectile launching device and positioned from a target.

FIG. 5 is an illustration of the sighting apparatus 100 mounted to a projectile launching device 501. The sighting apparatus is associated with axis LB that represents the central axis passing through the objective lens of the sighting apparatus and the projectile launching device is associated with axis LA representing a trajectory of a projectile through the bore of the projectile launching device. In some embodiments, when the projectile launching device is determined to be located below a threshold distance to the target 504, for example less than or equal to 25 meters, the trajectory of the projectile after firing is approximated by a straight line such that the trajectory of the projectile corresponds or substantially corresponds with axis LA of the projectile launching device. In other embodiments, when the projectile launching device is determined to be located above a threshold distance to the target 504, for example greater than 25 meters, the trajectory of the projectile after firing is approximated by a curved line 702 with respect to axis LA of the projectile launching device as described in further detail below in relation to FIG. 7.

The base point (Uo,Vo) of the sighting apparatus 100 represents the point on the focal plane 506 of the image detector 206 that intersects the axis LB. The base point has a corresponding point on the display 218 referred to herein as the 'aiming point'. In one embodiment, the base point is indicated by a visual representation on the display 218 for example, a reticle. The distance between axis LB of the sighting apparatus and axis LA of the projectile launching device is called the baseline height difference, E. In one embodiment, the baseline height difference can be measured directly. In another embodiment, the baseline height difference can be determined by adding the distance from the axis LA to the mounting mechanism to the distance from the axis LB to the mounting mechanism. In some instances, the distance between the LA and the mounting mechanism may be provided by the manufacturer of the projectile launching device and the distance from the axis LB to the mounting mechanism may be provided by the manufacturer of the sighting apparatus.

The impact point (Xo, Yo) displayed on display 218 of the sighting apparatus represents the impact point 502 of the projectile on the target 504. When the impact point of the target corresponds to the base point prior to the projectile being fired from the projectile launching device, the sighting apparatus is calibrated or "zeroed" and no further corrections are required. However, when the impact point of the sighting apparatus after a projectile has been fired from the projectile launching device does not correspond to the base point prior to the projectile being fired from the projectile launching device, the sighting apparatus is not calibrated and further corrections are required, for example, as described in further detail below with reference to FIGS. 6-8.

Figure 6:
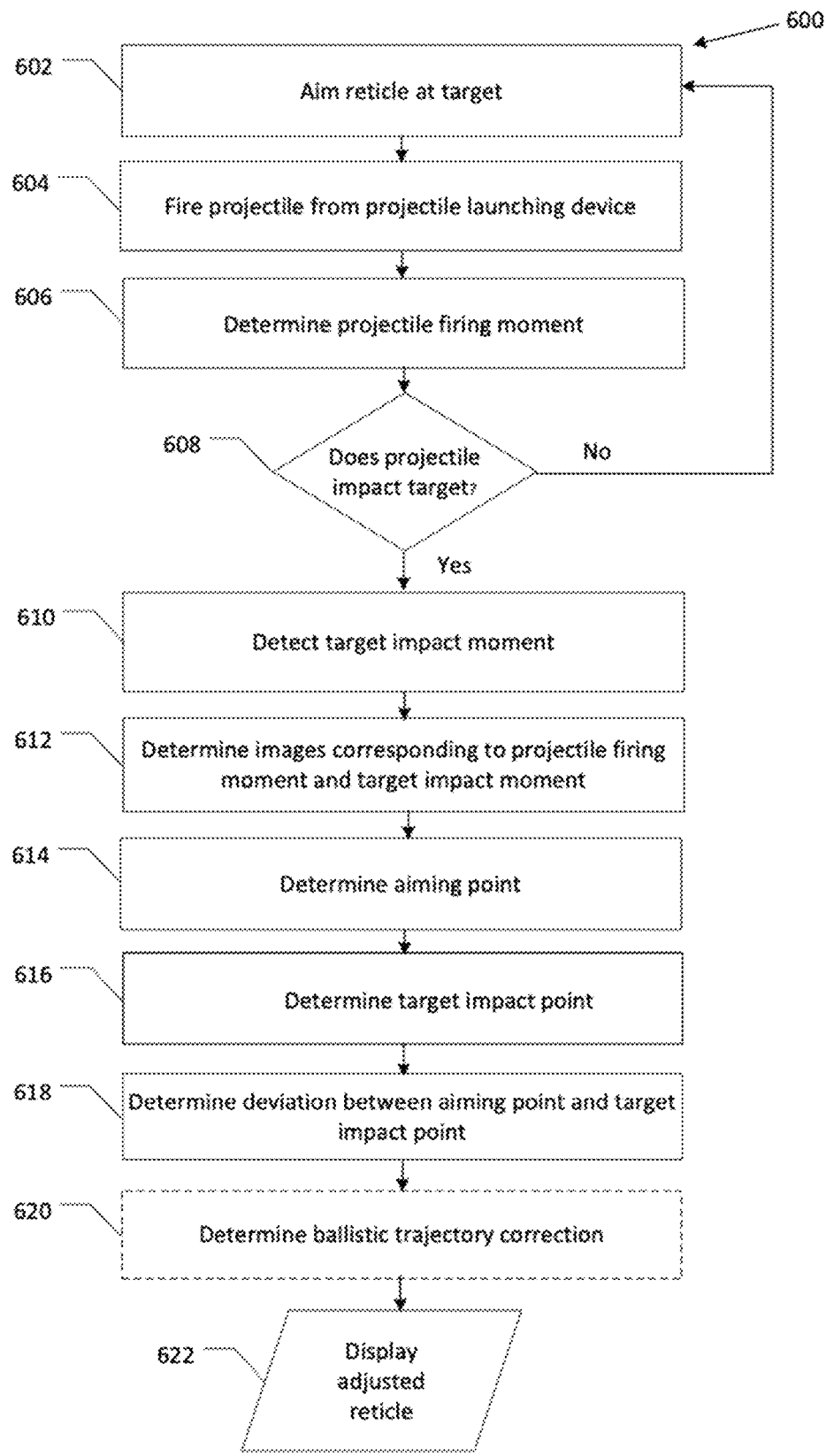
FIG. 6 is a flowchart illustrating a method for correcting the alignment of the projectile launching device with the target in accordance with an embodiment of the invention.

FIG. 6 illustrates a method 600 for calibrating (zeroing) the sighting apparatus to facilitate alignment of the projectile launching device with a potential target. Once the automatic zeroing/calibration mode of the sighting apparatus has been invoked, the processor 212 will continuously store the field of view images captured by the image detector 206 in memory 214. Each field of view image of the sequence of images may be associated with a timestamp. In some embodiments, the sequence of images is not less than one of: 20, 25, or 30 individual frames. The images taken by image detector may also be processed and stored in the memory according to a FIFO queue (First In, First Out).

At step 602, the user aims the displayed aiming point to a desired target. As previously mentioned, the displayed aiming point corresponds to the base point (Uo,Vo) of the image detector 206. In some embodiments, the aiming point is indicated on the display by one or more visual representations. In one example, the visual representation is a reticle having a series of lines or markings for assisting the user to aim the projectile launching device at the target. In another example, the visual representation is a square, rectangle, triangle, circle or any other suitable shape. In another example, the visual representation is an object, such as an animal. The user may aim the center of the displayed reticle towards the centre of the target or towards any location on the target.

The target may be any one or more of: a static target, a dynamic target, a non reactive target, a reactive target, or an interactive target. Ideally, the target is a well-defined target, meaning a target with number of clearly discernible surface features, in order to assist in image capture and processing. The target may further be made from any suitable material including rubber, wood, paper, cardboard, or foam. The target may be either 2 dimensional or 3 dimensional. The target may be mounted to a support or may be free-standing. The target may be any suitable colour or combination of two or more colours, such as red, blue, yellow, and white. The target may have visually identifiable features such that a user can discern the target from the surrounding environment. The type and material of the target may also be selected based on its thermal emissivity. The target may have any suitable dimensions and may be located at any suitable distance from the projectile launching device and sighting apparatus. For example, the target area may be a minimum of 50 cm by 50 cm and be located at a minimum of 25 meters from the projectile launching device. In another example, the target is located within a range of 15-35 meters from the projectile launching device.

At step 604, the user fires a projectile from the projectile launching device and the moment that the projectile was fired from the projectile launching device will be determined at step 606. The projectile may be any one or more of: a bullet, an arrow, missile, rocket, or a ball. The moment that the projectile was fired from the projectile launching device maybe determined from one or more of any appropriate sensed events, such as a characteristic acceleration of the projectile launching device detected by the accelerometer, a higher frequency (and/or higher amplitude) sound wave detected by the ultrasonic sensor, or distortion/sudden movement in the image sequence captured by the imaging detector. In one embodiment, as discussed above, the moment that the projectile was fired from the projectile launching device is determined from a combination of (a) a particular physical movement of the projectile launching device and (b) a sound characteristic detected by an acoustic sensor. In a particular preferred embodiment, this may be a combination of detection of the acceleration of the projectile launching device detected by an accelerometer and a high frequency sound wave detected by a sonic sensor.

Once the bullet firing moment is determined, the sequence of images prior to, and after, the projectile firing moment are determined for evaluation. In some embodiments, the projectile firing moment corresponds to the time that the projectile was fired from the projectile launching device and the images that have a timestamp 10 seconds prior to, and after, this time are selected from the sequence of images detected by the image detector. In other embodiments, images that have a timestamp in any of the ranges of 1-5 seconds, 5-10 seconds, or 10-15 seconds prior to and after, the projectile firing moment are selected. In some embodiments, once the sequence of images prior to, and after, the bullet firing moment are determined, the processing and storage of the images according to a FIFO queue is discontinued.

At step 608, a determination will be made as to whether the projectile has impacted the target. When a projectile impacts and/or passes through a target, it will influence the physical properties of the target, such as colour, temperature, and shape. For example, the heat generated from the projectile when it impacts and/or passes through the material of the target will remain on the surface of the target for a period of time producing a temperature contrast between the hole and the surrounding target. In some embodiments, a determination is made from monitoring the sequence of images detected by the infrared detector to determine whether the temperature of the target has changed. In the instance that a temperature difference is detected, then a determination is made that the projectile has impacted the target. In other embodiments, a determination is made from monitoring the sequence of images detected by an imaging camera to determine whether the colour and/or brightness of the target has changed as a result of the projectile impacting and/or passing through the material of the target. In another embodiment, a determination is made by monitoring the sound waves detected by the ultrasonic transducer to discern when the target has been hit by the projectile.

The inventors have determined that using thermal imaging to detect the impact point on the target has significant advantages compared to solely optical imaging. In particular, in using black/white or colour contrast techniques in a visible light environment, the characteristics of a projectile hole can be unstable and this, combined with light leak detection from surrounding visual features, can result in misdetections of impacts. The significantly enhanced contrast available using thermal imaging provides a markedly more robust and reliable means of detection. In particular, the 'heat signature' of a projectile impact point on the target provides a clear indicator of impact. In addition, to aid in impact detection, a particular target can be used. For example, a high density rubber target can provide a highly discernible heat signature which remains for a significant period of time.

If the projectile misses the target (or if the aiming point was not on the target), steps 602-606 can be repeated until the projectile impacts the target. If the projectile has impacted the target, a target impact moment will be determined at step 610. In some embodiments, the target impact moment corresponds to the time that the projectile impacts the target and the images that have a timestamp 10 seconds prior to, and after, this time are selected from the sequence of images detected by image detector. In other embodiments, images that have a timestamp in any of the ranges of 1-5 seconds, 5-10 seconds, or 10-15 seconds prior to and after, the target impact moment are selected.

At step 612, an image immediately prior to the projectile firing moment ('projectile firing moment image') and an image shortly after the target impact moment ('target impact moment image') are selected from the sequence of images. For example, the individual image frames of the sequence of images taken prior to, and after, the projectile firing moment are compared and analysed to determine the displacement of the projectile launching device before and after firing. The displacement of the projectile launching device may be used to select the projectile firing moment image. In this embodiment, the selection of the projectile firing moment image and target impact moment image are not limited to a specific time after firing of the projectile launching device or impact of the target, rather they are selected based on the moment that the projectile was fired and the appearance of the impact on the target. Selecting an image immediately prior to the projectile firing moment and selecting an image immediately after the target impact moment may result in a more accurate calculation of the deviation as any images taken during recoil of the projectile launching device or while impacting the target will be associated with interference and/or distortion. In other embodiments, the selection of the projectile firing moment image and target impact moment image are selected based on a predetermined time range from firing, for example, 10-100 milliseconds, 1-10 seconds etc.

At step 614, the aiming point of the sighting apparatus is determined from the projectile firing moment image.

At step 616, the point of impact (Co,Uo) on the target is determined from the target impact moment image. As mentioned above, in some embodiments, when the projectile launching device is determined to be located below a threshold distance to the target, for example less than or equal to 25 meters, the trajectory of the projectile after firing is approximated by a straight line such that the trajectory of the projectile corresponds or substantially corresponds with axis LA of the projectile launching device. The distance between the axis LB of the sighting apparatus and the point of impact on the target will also be equal to the baseline height, E. The area between the axis LB indicated by the base point (Uo, Vo) and the axis Lo indicating the impact point (Xo, Yo) forms two geometrically similar triangles, which are demonstrated as the triangles F and G in FIG. 5. The relationship between the base point and the impact point is indicated by Formula 1:

$$(V_0 - Y_0) \times \frac{p}{f} = \frac{E}{D_0} \quad \text{(Formula 1)}$$

where p is the pixel pitch of the imaging detector and f is the focal length of the objective lens.

The deviation (dx, dy) between the target impact point and the aiming point is automatically determined from the target impact moment image and the projectile firing moment image (step 618). As will be understood, in other embodiments, the deviation and target distance may be wholly or partially measured by the user and input into the sighting apparatus.

In some embodiments, when the projectile launching device is determined to be located above a threshold distance to the target, for example greater than 25 meters, the trajectory of the projectile after firing will be influenced by various environmental factors, such as the effect of gravity, wind speed, wind direction, air resistance, atmospheric pressure as well as characteristics of the projectile, such as the type of projectile used and the energy of the projectile. Accordingly, the calculation of the deviation (dx,dy) may require a ballistic trajectory correction as indicated by Step 620 in FIG. 6 and described in further detail below in relation to FIG. 7.

At step 622, the reticle is displayed at a position on the display to correct for the deviation determined at step 616. Steps 616 and 618 are described in further detail in relation to FIG. 8 below. In one embodiment, the reticle is automatically positioned or adjusted by the sighting apparatus to correct for the deviation although it is also possible for the reticle to be manually positioned or adjusted by rotation of input mechanism 120. Automatic calculation of the deviation between the aiming point and the impact point and the automatic positioning of the displayed reticle may reduce the time taken by a user to correct the alignment of the projectile launching device with the target. Once the corrected reticle is displayed, the automatic zeroing/calibration mode of the sighting apparatus is discontinued and the apparatus enters a normal operation mode, for example, where the projectile launching device is positioned such that ejected projectiles, if the device is correctly aimed, will strike a desired location on the target.

As the figures illustrate, the sight images viewed by the user differ in a number of ways between the 'sighting shot' mode and the normal use mode of the apparatus. As FIGS. 4d-4g show, when the user is engaged in zeroing the sight, the reticle appears not as a set of cross hairs but instead as a square bounding box (the centre of the square bounding box corresponding to the cross hair intersection point prior to calibration), as accuracy of sighting on the target is not critical during this process. Once the process of zeroing is complete and the user returns to normal operating mode, the image is again superimposed with the cross hair reticle 416 (in a position adjusted in accordance with the calibration output). In other words, the reticle appears to the user in different ways at different times.

As will be understood from the above description, the invention relies on image processing methodology to compare two (or more) images in order to determine deviation between aiming and impact points. The images may potentially differ in size, resolution, perspective, etc., and hence simple pixel-by-pixel image comparison is generally insufficient. As the skilled reader will understand, a variety of suitable algorithms can be used to compare such images reliably. Such known algorithms include, for example, locality sensitive hashing techniques, Mean Squared Error (MSE) or Structural Similarity Index (SSIM) techniques, edge detection algorithms and 'region-of-interest' (ie, feature-based matching) analysis. Known template matching approaches can be applied, such as those using direct similarity metrics (for example, 'Sum and Absolute Difference' or 'Normalised Cross Correlation' techniques). By way of example, current advanced image matching algorithms which may be suitable for use with the present invention include SIFT Keypoint Detection (which takes into account scale and orientation image properties) and RANSAC (RANdom SAmple Consensus, an iterative transformation method suitable for use in aligning hash images).

Figure 7:
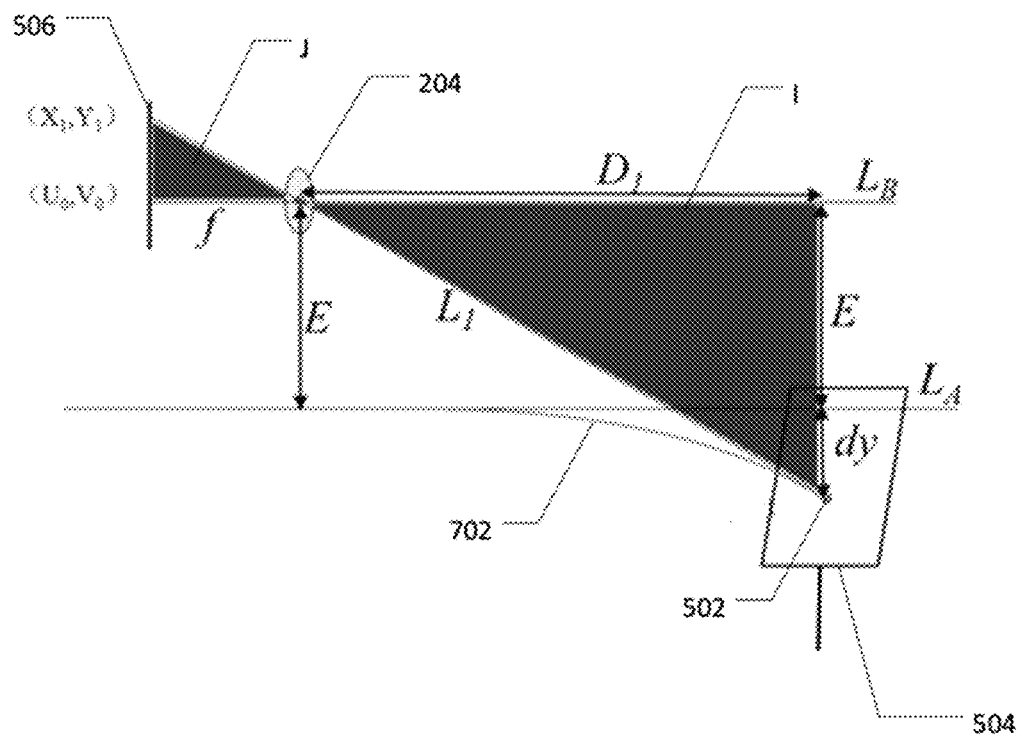
FIG. 7 is a diagram illustrating a ballistic trajectory correction.

FIG. 7 is a schematic illustration of a ballistic trajectory correction that represents the deviation (dx,dy) between the axis LA of the projectile launching device at the projectile firing moment and the impact point 502 on the target 504. In some embodiments, the ballistic trajectory correction can be calculated manually and entered at the display 218 of the sighting apparatus using the input mechanism 120. In other embodiments, the ballistic trajectory correction is calculated by the processing section 208 of the sighting apparatus. The ballistic trajectory correction requires a determination of the distance (Di) between the muzzle of the projectile launching device (not shown) and the target 504 and may be determined by the sighting apparatus or by one or more devices separate to the sighting apparatus, such as a laser rangefinder. Various characteristics of the environment and/or projectile may be detected by the sighting apparatus, for example, by the one or more sensors 216. Alternatively, one or more characteristics of the environment may be inputted into the sighting apparatus by the user or communicated to the sighting apparatus by one or more external devices.

The ballistic trajectory of the projectile is indicated by the curve 702. The curve 702 in FIG. 7 only shows the vertical deviation (dy) of the trajectory, but as will be appreciated by those skilled in the art, the trajectory is also associated with a horizontal deviation (dx). LA, LB, and E of FIG. 7 represent the axis of the projectile launching device, the central axis passing through the objective lens of the sighting apparatus, and the baseline height difference, respectively. The impact point on the target, the corrected reticle position, and center point of the objective lens form straight line Li. The intersection of Li with axis LB indicated by the base point (Uo,Vo) of the sighting apparatus forms two geometrically similar triangles, which are demonstrated as the triangles I and J in FIG. 7. The corrected reticle position is determined from Formula 2:

$$\begin{cases} \dfrac{(V_0 - Y_1) \cdot p}{f} = \dfrac{E + dy}{D_1} \\ \dfrac{(U_0 - X_1) \cdot p}{f} = \dfrac{dx}{D_1} \end{cases} \quad \text{(Formula 2)}$$

where p is the pixel pitch of the imaging detector and f is the focal length of the objective lens.

Figure 8:
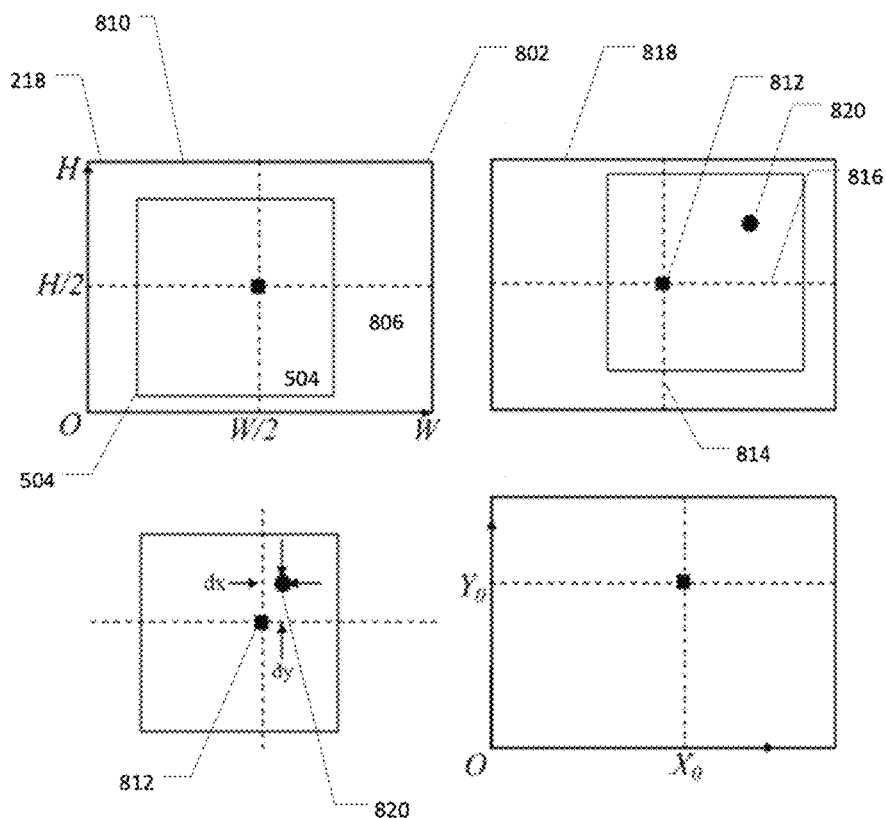
FIG. 8 is a diagram illustrating the correction of the alignment of the projectile launching device with the target in accordance with an embodiment of the invention.

FIG. 8 illustration of the deviation (dx,dy) determined between the target impact point and the aiming point and the corresponding adjustment of the aiming point. FIG. 8 illustrates the projectile firing moment image 802 including a target 504 located within a surrounding environment 806. In the embodiment shown in FIG. 8, the target 504 and the display 218 are provided with a bounding box 806, 810 delineating the boundary of the target and display, respectively. The aiming point is represented by reticle 812 that has a plurality of intersecting lines 814, 816 each representing the central axis (H/2) of the height (H) and the central axis (W/2) of the width of the display, respectively.

FIG. 8 illustrates the target impact moment image 818 and one or more visual representations 820 of the impact point 502 on target 504. The deviation (dx,dy) between the target impact point 820 determined from the target impact moment image 818 and the aiming point 812 from projectile firing moment image 802 is illustrated in FIG. 8. This deviation is used in Formula 3 to determine the corrected reticle position (Co,Uo) as shown in FIG. 8:

$$X_0 = \frac{H}{2} + dx, \quad Y_0 = \frac{W}{2} + dy \quad \text{(Formula 3)}$$

where W and H represent the number of horizontal and vertical pixels of the detector, respectively.

Although the above description uses terms "first," "second," etc. to describe various elements, these elements should not be limited by the terms. These terms are only used to distinguish one element from another. For example, a first threshold value could be termed a second threshold value and, similarly, a second threshold value could be termed a first threshold value, without departing from the scope of the various described embodiments. The first threshold value and the second threshold values are both threshold values, but they are not the same threshold value.

In the embodiment described above, the system of the invention is incorporated into or comprises a sight for attachment to a rifle or other projectile launching device. However, as noted previously in this specification, the system may comprise a separate device attachable to a traditional optical sight, including the image capture and processing module(s). Alternatively, the system may be incorporated into the projectile launching device itself (as part of or comprising the sight or separate thereto).

It will be understood that the invention disclosed and defined in this specification extends to all alternative combinations of two or more of the individual features mentioned or evident from the text or drawings. All of these different combinations constitute various alternative aspects of the invention.

What is claimed is:

1. An apparatus, configured for a projectile launching device, the apparatus comprising:
    a sight, comprising a viewfinder configured to enable a user to view an image of a target in association with a reticle;
    a digital image system, configured to capture images of the target viewed in the viewfinder; and
    one or more sensors, configured to detect a firing time, wherein the firing time is a time point when a projectile is ejected from the projectile launching device,
    the apparatus configured to capture one or more first images, wherein the one or more images are images captured at or close to said firing time, said one or more first images are associated with the position of the reticle,
    wherein an image processor is configured to compare images captured after said firing time with said one or more first images, and to identify an indication of a projectile impact on said target,
    the apparatus is further configured to capture one or more second images, the one or more second images are images captured after said firing time and comprising said projectile impact indication,
    and wherein the apparatus comprises a reticle adjuster, configured to automatically position the reticle in the viewfinder in accordance with a comparison between said one or more first images and said one or more second images and the associated positions of the reticle and the projectile impact indication;
    wherein the apparatus further comprises a thermal imaging system, configured to capture thermal images as the one or more first images and/or the one or more second images, wherein the thermal images are captured based on heat generated from the projectile when the projectile impacts the target.

2. The apparatus of claim 1, wherein, the apparatus is configured to operate in two modes comprising:
    a first mode, being a user-selectable 'sighting shot' mode, wherein in the first mode, an automatic reticle positioning is provided to the user; and a second mode, being a normal operation mode, wherein in the second mode, the sight of the projectile launching device provides a resulting positioned reticle.

3. The apparatus of claim 1, wherein the thermal imaging system is configured to capture infrared light information to be used by the digital image system and the image processor.

4. The apparatus of claim 1, wherein the projectile impact indication is a heat signature characteristic of the projectile impacting on the target.

5. The apparatus of claim 1, wherein, the target has a number of discernible surface features to assist in image processing.

6. The apparatus of claim 1, wherein the one or more sensors are configured to sense physical movement of the apparatus and/or the projectile launching device characteristic of ejection of the projectile from the projectile launching device.

7. The apparatus of claim 1, wherein the one or more sensors comprise a movement or shock sensor and a sonic sensor.

8. The apparatus of claim 1, wherein the one or more sensors comprise an image analyser configured to act as a sudden movement sensor, to detect rapid movement characteristics in the image, characteristic of a recoil of the projectile launching device on ejecting the projectile.

9. The apparatus of claim 1, wherein the image processor is configured to compare an aiming image with an impact image, wherein the aiming image is one of said one or more first images captured at or shortly before said firing time, the impact image is one of said one or more second images captured at or shortly following the moment of first identification of the indication of the projectile impact on the target.

10. A method for calibrating a sight of an apparatus configured for a projectile launching device, said apparatus comprising: a viewfinder that enables a user to view an image of a target in association with a reticle, a digital image system configured to capture images of the target viewed in the viewfinder, and one or more sensors configured to detect a firing time, wherein the firing time is a time point when a projectile is ejected from the projectile launching device, wherein the method comprises:
capturing one or more first images at or close to said firing time, wherein said one or more first images are associated with a position of the reticle;
using an image processor to compare images captured after said firing time with said one or more first images, and to identify an indication of a projectile impact on said target;
capturing one or more second images, wherein the one or more second images are images captured after said firing time and comprise said projectile impact indication;
automatically positioning the reticle in the viewfinder in accordance with a comparison between said one or more first images and said one or more second images and the associated positions of the reticle and the projectile impact indication;
wherein the identification of the indication of the projectile impact on said target includes identifying a heat signature characteristic of the projectile impacting on the target.

11. The method of claim 10, further comprising operating the apparatus at a first stage and a second stage,
wherein, in the first stage, the apparatus is operating at a user-selectable 'sighting shot' mode for providing the automatic reticle positioning; and
in the second stage, the apparatus is operating at a normal operation mode for use of the projectile launching device with the sight provided with the resulting positioned reticle.

12. The method of claim 10, wherein the capturing of the one or more first images and/or the capturing of the one or more second images comprises: capturing thermal images for use with the image processor.

13. The method of claim 10, further comprising sensing physical movement of the apparatus and/or the projectile launching device, wherein the physical movement is characteristic of ejection of the projectile from the projectile launching device.

14. The method of claim 13, wherein said physical movement is identified by an image analyser, and the sensing physical movement comprises: detecting rapid movement characteristics in the image, and detecting characteristic of a recoil of the projectile launching device on ejecting the projectile.

15. The method of claim 10, further comprising sensing a movement phenomenon and a sonic phenomenon.

16. The method of claim 10, further comprising: comparing an aiming image with an impact image, wherein the aiming image is one of said one or more first images captured at or shortly before said firing time, the impact image is one of said one or more second images captured at or shortly following the moment of first identification of an indication of the projectile impact on the target.

17. An apparatus comprising an infrared thermal sight mounted on a projectile launching device, the apparatus comprising a display viewable by a user and a scroll/press interface mechanism for use by the user in controlling operation and functions of the sight, the scroll/press interface mechanism configured for rotation and pressing, whereby a long press, a short press and repeat short presses provide respective different ways to access and select operations or functions of the sight.

18. The apparatus of claim 17, wherein the apparatus excludes any additional user interface elements for controlling the operation and functions of the infrared thermal sight which are viewable by the user on the display.

19. The apparatus of claim 17, wherein the long press of the scroll/press interface mechanism is performed to unlock a scope and provide access any other operations or functions of the infrared thermal sight.

* * * * *

UNITED STATES PATENT AND TRADEMARK OFFICE
CERTIFICATE OF CORRECTION

| | | |
|---|---|---|
| PATENT NO. | : 12,276,482 B2 | Page 1 of 1 |
| APPLICATION NO. | : 18/780532 | |
| DATED | : April 15, 2025 | |
| INVENTOR(S) | : Hong Lin Bian | |

It is certified that error appears in the above-identified patent and that said Letters Patent is hereby corrected as shown below:

On the Title Page

In Item (71) Applicant, the correct data of the applicant should read "UNIWIN SMART PTY LTD, Springvale (AU)"

Signed and Sealed this
Twenty-fourth Day of June, 2025

Coke Morgan Stewart
*Acting Director of the United States Patent and Trademark Office*